Nov. 8, 1949 L. ERIKSSON 2,487,322
SAW CHAIN TENSIONING DEVICE FOR CHAIN SAWS
Filed April 9, 1946 3 Sheets-Sheet 1
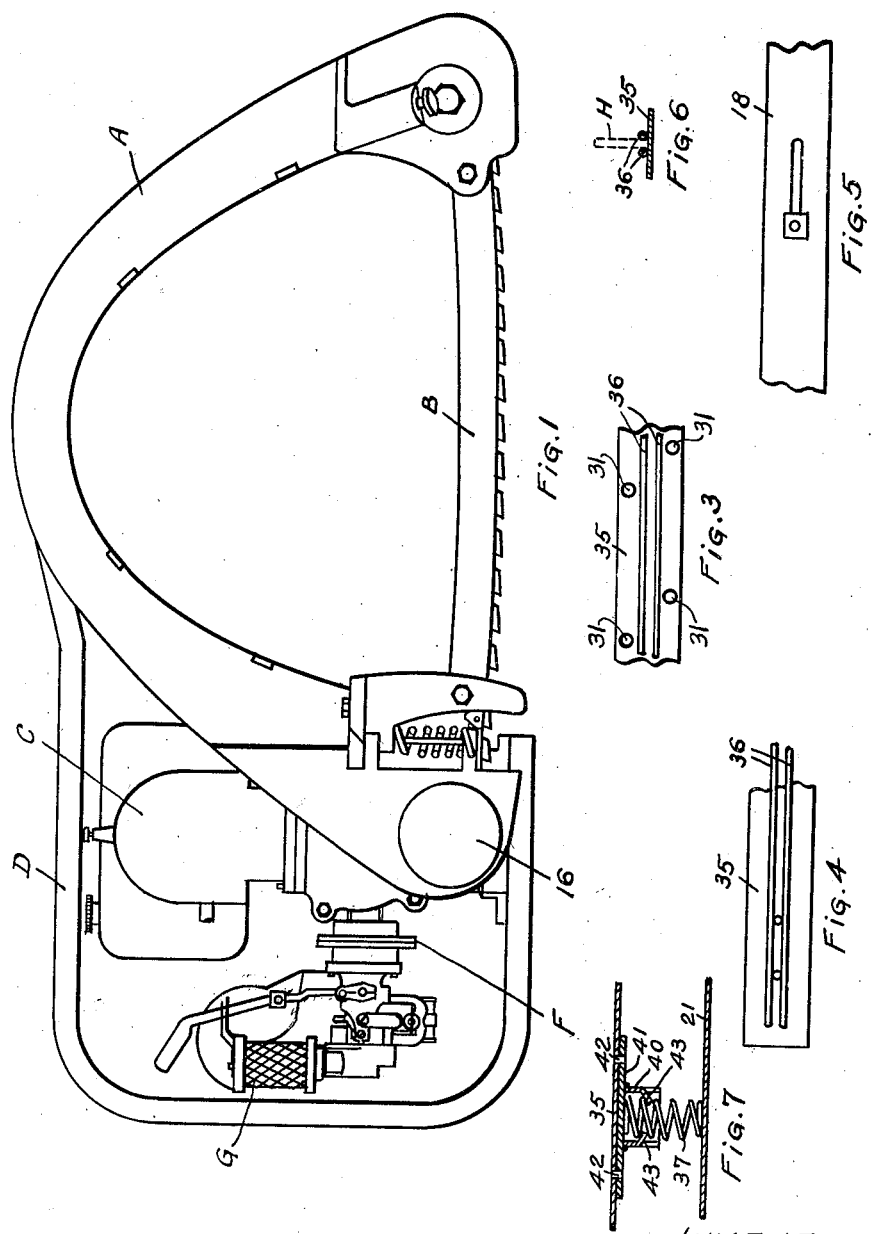
INVENTOR
LEONARD ERIKSSON
By
ATTORNEY

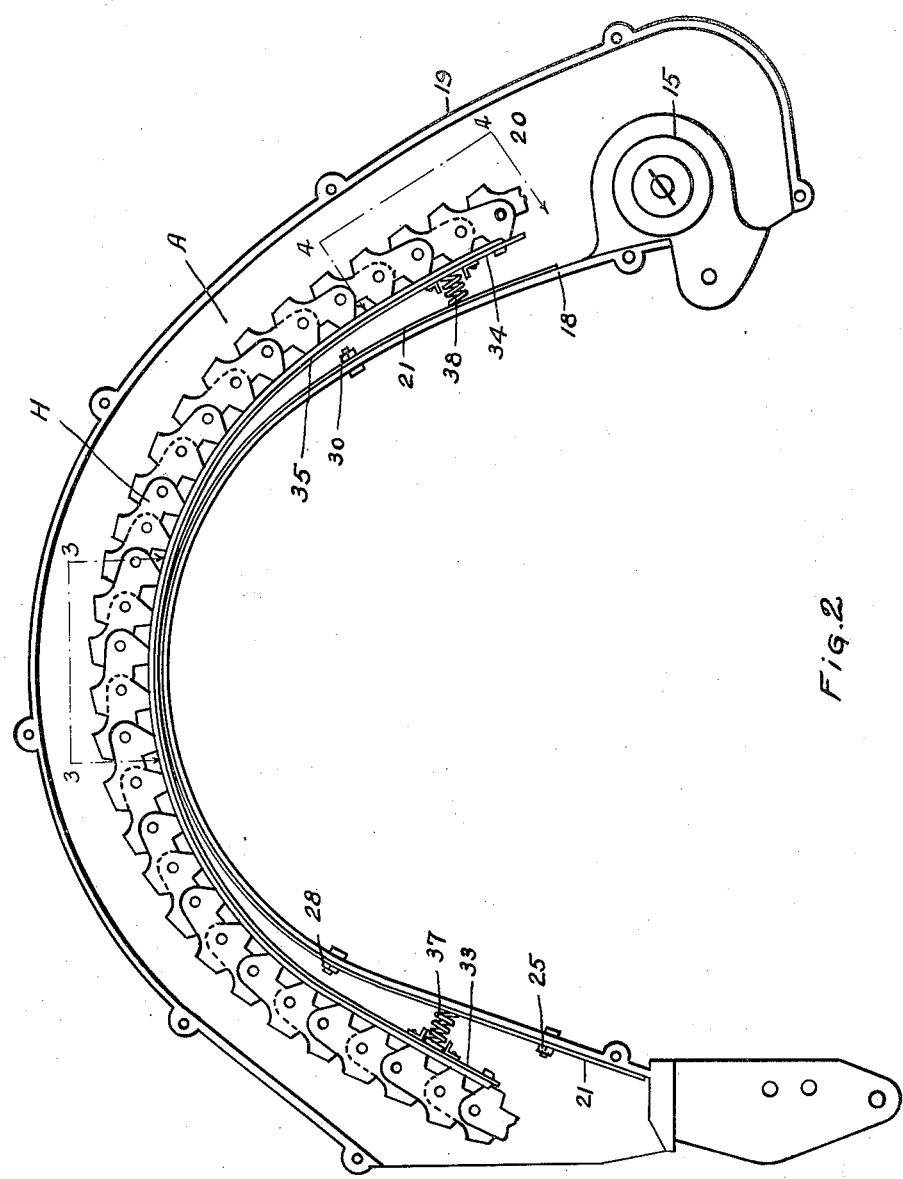

Patented Nov. 8, 1949

2,487,322

UNITED STATES PATENT OFFICE 2,487,322

SAW CHAIN TENSIONING DEVICE FOR CHAIN SAWS

Leonard Eriksson, Montreal, Quebec, Canada, assignor to Precision Parts Limited, Montreal, Quebec, Canada, a corporation of the Province of Quebec Application April 9, 1946, Serial No. 660,635

2 Claims. (Cl. 143—32)

Introduction

This invention relates to a power-driven chain saw.

While the art of power-driven saws of the general type to which this application relates is highly developed, the devices presently available still possess certain disadvantages.

For example, the tensioning devices, now in use, are intricate and are very easily put out of adjustment by the bucking of the saw, or by shocks received when the saw chain encounters a knot, resulting in many adjustments while sawing, and continual maintenance.

It is therefore a principal object of this invention to provide a simple, lightweight and positive means, whereby one adjustment sets the proper length of the run for the saw chain, and a means whereby the proper resilient tension is automatically maintained on the running saw chain. Other advantages will become clear in the description to follow.

Preferred structure

With the above-mentioned and other objects in view, a preferred form of chain saw embodying the present invention is as follows. In general, the saw can be described as having a bowed frame, a grooved saw rail joining the ends of the bow, and an endless saw chain mounted for travel around this assembly, a power unit driving said chain, a clutch for engaging and disengaging the power unit from the saw chain, and a frame, surrounding the power unit, designed to provide a handling means for the saw in use, and as a portable unit.

The bowed frame of this preferred structure consists of a channel cross section casting having a web, and a lower and upper flange. Attached at one end and with the other end adjustable in a slot fastening to the lower flange, is a spring metal strap, extending over the apex of the bow. As will be understood, the sliding of the strap fastening in the slot will push the mid-section of the strap up and away from the flange at the apex, thus lengthening the run of the saw.

Attached rigidly by means of rivets or the like to the mid-section of the aforementioned strap is the saw chain guideway. This guideway comprises a hard spring metal strip on which is mounted a pair of wires, forming side walls, limiting the lateral movement of the saw chain. The free ends or wings of the guideway are spring mounted, maintaining at all times a resilient tension on the saw chain. The fact that this guideway is mounted on a resilient strap in the centre and supported at each end by spring means, gives the guideway a highly resilient and shock-absorbing quality, thereby eliminating much of the vibration usually encountered in this type of saw. The sale and use of saws incorporating this type of tensioning device has proven its superiority in the field.

Detailed description

In order to explain in more detail the features of this invention, we now enter into a more detailed description of a preferred form of chain saw embodying the invention by reference to the accompanying drawings, in which:

Figure 1 shows a side view of the power chain saw of the bow type.

Figure 2 is an open view showing the saw chain and the tensioning devices.

Figure 3 shows the method of attaching the saw guideway to the extension strap 3—3, figure 2.

Figure 4 is a plan view of the end of the guideway 4—4 Figure 2.

Figure 5 shows the slot and screw structure for adjusting the extension strap to permit the increase or decrease of the tension on the saw chain 5—5, Figure 8.

Figure 6 is a sectional view of the guideway.

Figure 7 is a sectional view of a preferred form of mounting the spring on the free end of the guideway.

Figure 8:
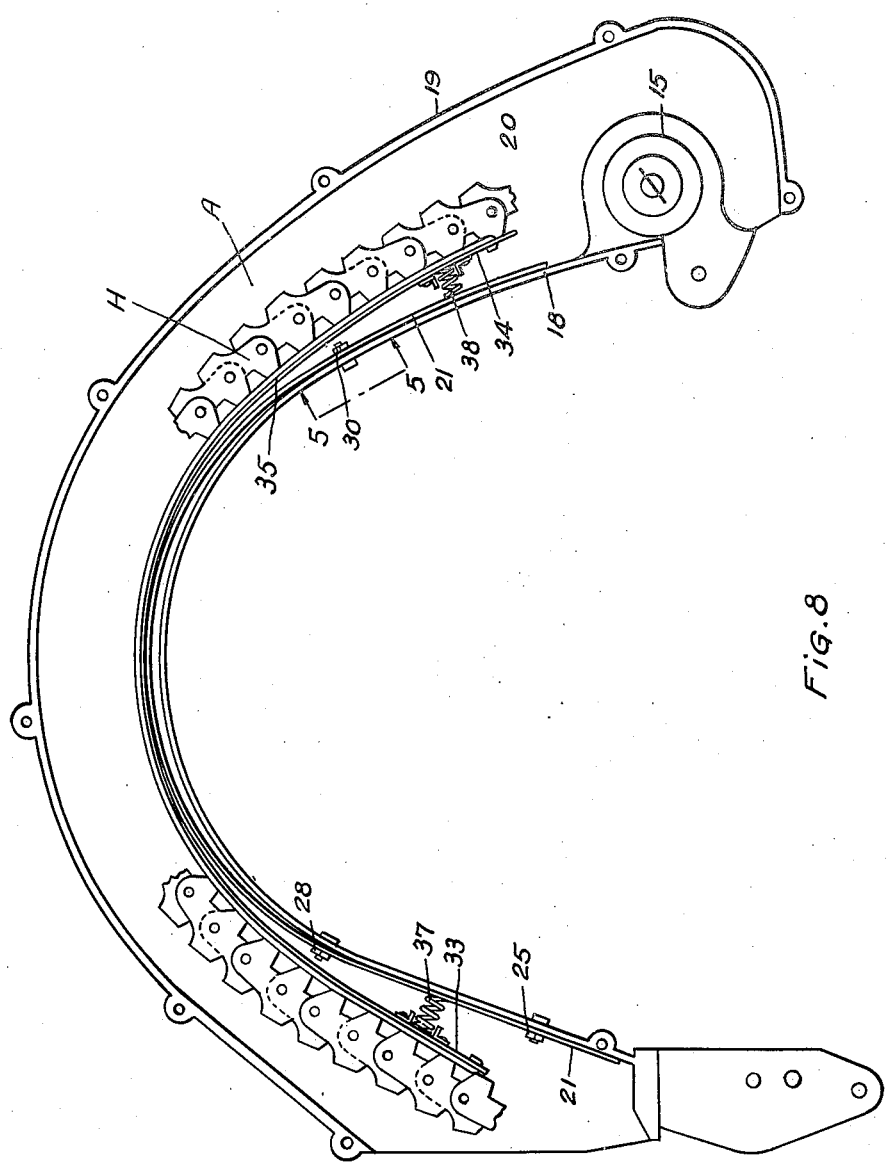
Figure 8 is an open view showing the extension strap in the extended position.

In the preferred form illustrated, the bow-shaped frame A, has a channel cross section comprising the web 20, an upper flange 19 and a lower flange 18. A grooved saw rail B joins the two ends of the bow adjacent to the idler pulley 15 and the driving pulley 16. The said driving pulley is driven by the power unit C, which may be an electric motor, or as shown in the drawings, a gasoline engine, mounted in the frame D, which is shaped to provide a handling means for the saw. The carburetor assembly G, is fitted to the engine by a swivel union F (see Livingston et al., copending application, S. N. 535,186, filed December 10, 1945), now abandoned, which allows the carburetor to be maintained in a vertical position while the saw is tilted to an angle, such as approximately 90° for felling.

A hard metal strip 21, or extension band, is fastened rigidly at one end by bolts or other means 25 and 28 to the inside of the flange 18 and passed loosely over the apex of the lower flange 18 of the bow frame. The other end of the extension band is adjustably attached to the flange 18 at 30 by means of a bolt slidable in a slot cut in the flange 18. As will be understood the sliding of this bolt 30 toward the apex of the bow will force the extension band up and away from the flange 18 midway between the rigid fastening 28 and the bolt 30, thus lengthening the run of the saw chain H. This procedure may be reversed, having the slot cut in the extension band and secured by a bolt to the flange 18, the operation being the same.

Rigidly fixed to the extension band 21, at the apex of the bow, by means of rivets 31 or the like (see Figure 3) is a flexible hard metal saw chain guideway member 35. Fixed to this guideway is a pair of spaced-apart wires or members 36 forming a channel, limiting the lateral movement of the saw chain H. The free ends or wings 33 and 34 of the guideway 35 are urged outwardly from the flange 18 by a pair of springs 37 and 38 forcing the guideway against the saw chain H thereby causing a resilient or floating tension to be maintained on the saw chain, the springs 37 and 38 being attached to the band 35 by means of cup member 40 which is welded to a flat base piece 41 riveted or attached by other means at 42 to the band 35. The sides of the cup member 40 being split and the resulting ears 43 being bent in, thus retaining the spring 37 or 38, the opposite or free end of the spring 37—38 being adapted to contact and rest freely on the extension band 21. Variations of this method are many and the cup 40 may be attached to the extension band 21 if desired thus leaving the spring loose against the back of the guideway or tensioning band 35.

*Operation and advantages*

As may be seen by one versed in the art, the advantages of this invention are in its simplicity of construction and therefore maintenance is cut proportionately. The proper cutting tension for the job to be done is applied to the saw chain by manipulation of the bolt 30 in the slot thus lengthening or shortening the run of the saw chain depending on the distance the mid-section of the extension band is away from the apex of the bow. No further tension adjustment is needed to the saw chain as a running tension is maintained by the spring urged wings of the guideway.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

I claim:

1. A chain saw, comprising, a bow frame, a bow-shaped chain supporting surface on said frame, a flexible insert lining said surface, means for retaining the flexible insert away from said surface to vary the length of the saw chain run, a flexible saw guideway member superimposed on said insert for guiding the rearward run of the saw chain, an intermediate portion of said member being secured to said insert, an end of said member being free of said insert and resilient means urging said free end away from said insert, thereby to maintain a constant tension on said saw chain.

2. A chain saw as in claim 1, wherein said resilient means comprises, a helical spring, a cup and base member rigidly attached to the flexible saw guiding member, ears on said cup member bent in to retain one end of said helical spring, the other end of said spring being adapted to rest against said insert thereby to urge said saw guiding member away from said insert.

LEONARD ERIKSSON.

REFERENCES CITED

The following references are of record in the file of this patent:

UNITED STATES PATENTS

| Number | Name | Date |
|---|---|---|
| 1,562,732 | Arsneau | Nov. 24, 1925 |
| 1,584,630 | Meighan | May 11, 1926 |
| 2,109,702 | Lange | Mar. 1, 1938 |